May 27, 1930.  C. E. JENKINS  1,759,984
FILTER
Filed June 22, 1928
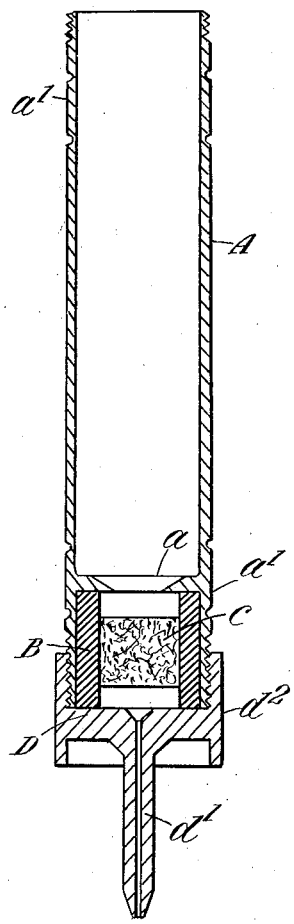

Patented May 27, 1930

1,759,984

UNITED STATES PATENT OFFICE

CHARLES EVANS JENKINS, OF MANCHESTER, ENGLAND, ASSIGNOR TO JOHN J. GRIFFIN AND SONS LIMITED, OF LONDON, ENGLAND

FILTER

Application filed June 22, 1928. Serial No. 287,396.

This invention relates to filters and has for its primary object to provide a filter for the rapid filtration of small quantities of fluid with only slight loss. A further object is to provide such a filter which may be easily cleaned and sterilized.

According to the invention the filter comprises a tubular body, a filtering element therein and means to secure said element in place so that liquid can pass through the body only by passing through the filtering element.

In order that the invention may be clearly understood and readily carried into effect, the same will now be described more fully with reference to the accompanying drawing, which is a vertical section of a filter constructed in accordance with the invention.

The body A of the filter consists of a cylindrical metal tube screw-threaded at the lower end and provided with an annular shoulder or stop $a$ within it and near to that end. A rubber sleeve B fits closely within the lower end of the tube and abuts against the stop $a$. A porcelain filter block C fits closely within the rubber sleeve B. A screw threaded member D is adapted to screw on to the lower end of the body A and has an open tubular extension $d'$ communicating with its interior. The apparatus is made ready for use by placing the rubber sleeve and the porcelain block in position within the lower end of the main tube and screwing on the member D which forces the sleeve B against the stop $a$ compressing it and causing it to grip the porcelain block tightly by lateral pressure. A liquid-tight joint is thus formed between the edge of the block C and the body A so that the only communication between the upper and lower parts of the body A is through the pores of the filter block C.

The liquid to be filtered is poured into the upper part of the body A and the tubular extension $d'$ is preferably inserted into the stopper of a flask exhausted by a pump. It will be seen that the whole of the liquid is forced to pass through the filter block before any air can pass and thus the only loss is that amount of fluid which is held in the pores of the said block. The filter may readily be taken part and the parts sterilized and re-assembled immediately before use.

Milled bands $a'$ are provided on the body A and the edge $d^2$ of the member D is milled in order to facilitate the screwing and unscrewing of the parts.

What I claim and desire to secure by Letters Patent of the United States is:—

1. A filter comprising a tubuluar body, a filter block therein, a rubber sleeve surrounding said block projecting beyond the ends of the latter, an annular stop within said body against which the upper end of said sleeve abuts, a screw threaded member having a tubular extension and adapted to screw onto said body and bear against the lower end of said sleeve so as to compress the sleeve lengthwise between said member and said stop and secure the filter block in the body in a liquid-tight manner by lateral pressure.

2. A filter comprising a tubular body, a filtering element therein, packing surrounding and extending above and below said element, and means for compressing said packing to cause the filtering element to be secured in place so that liquid can only pass through the body by passing through the filtering element.

3. A filter comprising a tubular body, a preformed filter block therein, a resilient sleeve of greater length than the filter block within which the filter block fits with the resilient sleeve projecting beyond each end thereof, and means for exerting pressure in said sleeve lengthwise to cause it to expand inwardly and thus to secure the filtering block in position in the body in a liquid tight manner.

CHARLES EVANS JENKINS.